Sept. 7, 1965  R. E. V. RAMSING  3,204,807
HINGED ELECTRICAL COVER PLATE CLOSURE
Filed Dec. 23, 1963
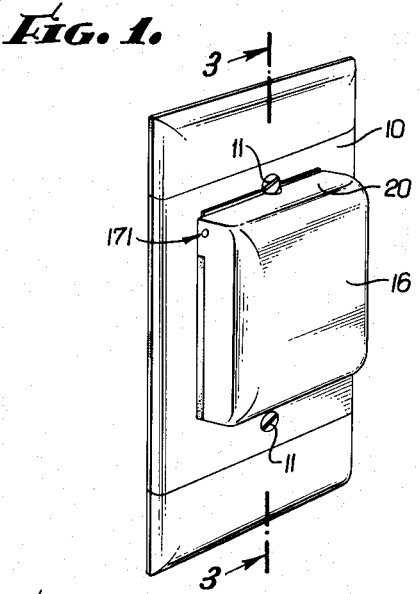
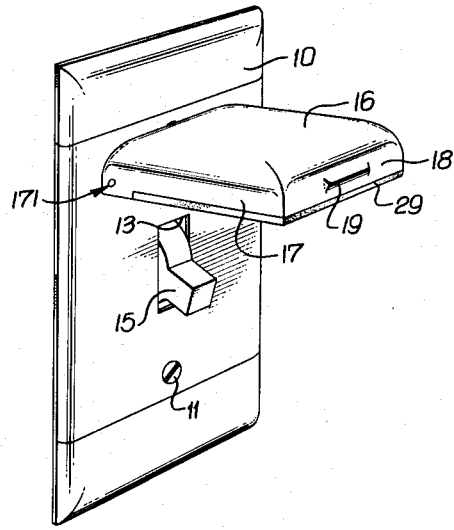
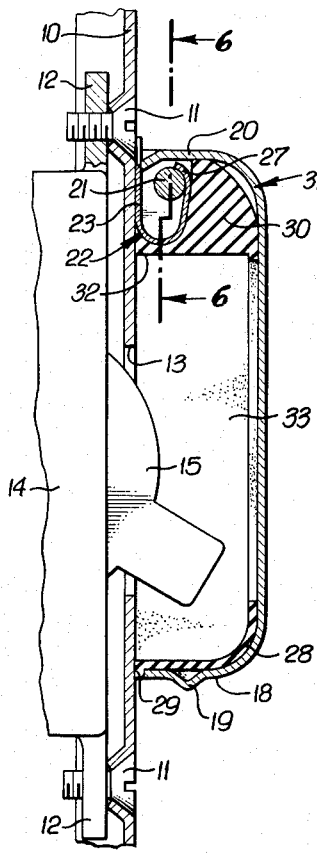
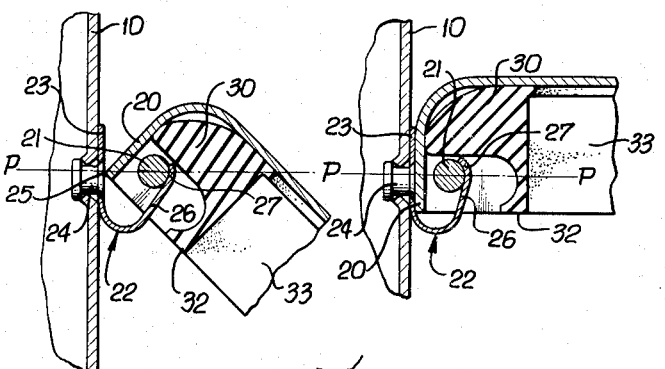
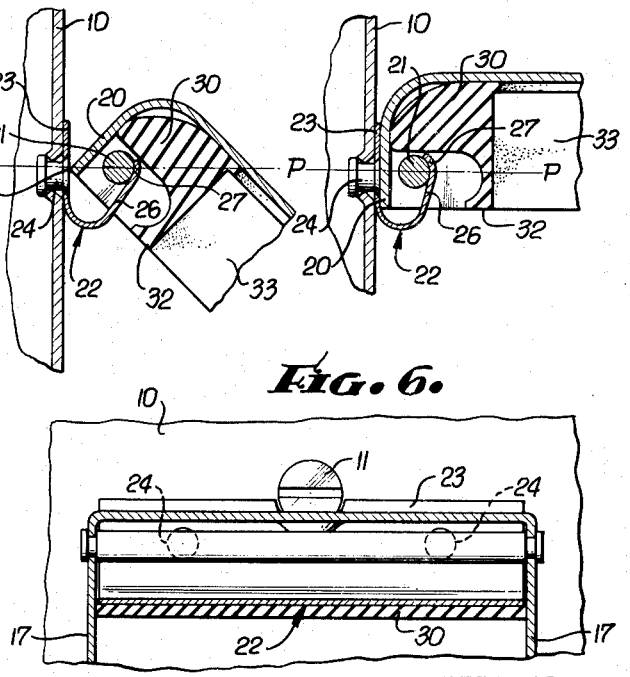
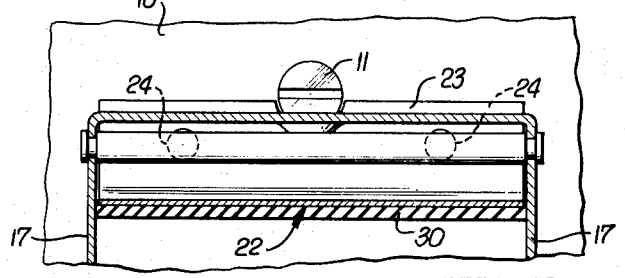
INVENTOR.
ROBERT E. V. RAMSING
BY *White & Haefliger*
ATTORNEYS.

3,204,807
HINGED ELECTRICAL COVER PLATE CLOSURE
Robert E. V. Ramsing, Whittier, Calif., assignor to Sierra Electric Corporation, Gardena, Calif., a corporation of California
Filed Dec. 23, 1963, Ser. No. 332,715
8 Claims. (Cl. 220—24.3)

This invention relates generally to improvements in cover or closure plates adapted to be mounted on wall or like surfaces in overlying relation to any of various electrical devices such as switches and connector receptacles. Such plates may have one or more electrical device access openings depending on the nature of the installation. For present purposes the invention will be described typically as applied to a simple form of wall plate containing a single access opening and a single weatherproof cover.

The invention has for its general objects to provide for the hinge mounting to the base plate of a cover affording a weatherproof seal about the access opening and a simple and highly effective hinged association with the base plate that provides for spring-urged maintenance of the cover in closed condition, and yielding retention of the cover in open position.

More particularly, the invention provides for accomplishment of these objectives by a form of "over center" type of hinge, the requirements for which are reduced to the combination of a simple spring clip retaining a pin inside the cover, and in association with which the edge of the cover itself serves as a shifting fulcrum in the over-center hinge action.

In its preferred form the hinge assembly comprises a spring clip essentially U-shaped in cross section, one side of which is secured to the base plate and the other side engaged against a pin extending through the clip into the sides of the covers. The clip and pin parallel one side of the cover in such relation that as the cover is swung open initially against the clip spring resistance, the cover edge is displaced as a shifting fulcrum from one to the other sides of an axial plane of the hinge pin normal to the base plate to effect the over center action, all as will later appear.

The invention further assures the maintenance of a weather tight seal about the plate access opening by providing inside the cover an elastomeric liner preferably flanged against three cover side edges and extended transversely within the cover at the inside of the hinge clip and pin to have sealing engagement with the plate completely about the access opening.

All the various features and objects of the invention, as well as the details of an illustrative embodiment will be further understood from the following detailed description of the accompanying drawing, in which:

FIG. 1 is a view showing the closed cover plate assembly in perspective;

FIG. 2 is a similar view showing the access opening cover in open position;

FIG. 3 is an enlarged fragmentary vertical cross section taken in the plane of line 3—3 of FIG. 1;

FIGS 4 and 5 are fragmentary sections showing the cover in progressive opening stages; and FIG. 6 is a cross section on line 6—6 of FIG. 3.

The assembly is shown generally to comprise a base plate 10 mountable on a wall surface by screws 11 threaded into the flanges 12 of an electrical device which, as previously indicated, may be of any of various types inclusive of switches and receptacles requiring access through an opening 13 in the base plate 10. Merely as illustrative, the electrical device 14 may be a switch having its throw arm or lever 15 projecting out through the opening 13. The latter normally is closed by a cavitated cover 16 hinged to the plate 10 at 171 for swinging between the closed and open positions of FIGS. 1 and 2.

The cover 16 may be formed as a stamping having sides 17, an outer end 18 formed with a handle lip 19, and an upper or inner end 20 at which the cover hinges to the base plate. The hinge structure comprises a pin 21 extending within the cover in spaced and parallel relation to the side 20, the ends of the pin terminating in the sides 17. The pin is received within a spring metal clip 22, one side 23 of which is secured by rivets 24 to the base plate 10 and extends flatly against the plate so as to be engageable by the edge 25 of the cover side 20. The opposite side 26 of the clip is deflected toward its edge to have curved bearing at 27 against the pin 21.

In the normal closed cover condition illustrated in FIG. 3, the clip 22 is stressed sufficiently that its side 26 exerts sustained closing pressure against the pin 21 and therefore the cover 16. In the course of its opening movement the cover edge 25 acts as a fulcrum in being shifted transversely along the surface of the clip side 23 and against the spring resistance of the clip which continues to exert its resistance to opening of the cover until the edge 25 reaches what may be termed the "on center" position of FIG. 4 where the edge aligns with a plane P—P normal to the base plate and intersecting the axis of the pin. Continued movement of the cover carries the pin 21 to an over center position causing the clip to throw the cover to the fully open position of FIG. 5 at which the cover is substantially normal to the base plate and has its side 20 flatly engaged against the clip arm 23. As will be apparent, the reverse, essentially snap action of the clip and pin in their relation to the fulcrum edge 25 occurs as the cover is swung toward closed position.

The cover confinement about the aperture 13 is waterproofed by providing the cover with a sealing, preferably elastomeric, liner 28 which is conformed with the inner surfaces and curvatures of the sides 17 and 18, the liner having a peripheral flange 29 engaged against the three cover side edges so that the spring clip urges the cover against the flange and the latter serves as an uninterrupted seal along the cover edges against which it bears, under compression sustained by the clip thrust. The liner has a thickened portion 30 extending about the end of the clip 22 and between the latter and the cover wall at 31, this thickened portion presenting a sealing face or edge at 32 which extends across the inside of the cover to join with the sides 33 of the liner, thereby completing the seal about aperture 13. Like flange 29, the liner surface 32 is pressed by the clip spring thrust against the face of the base plate 10.

In the interests of affording strong support for the cover by the clip 22, and to assure the exertion of sufficient pressure by the sealing edges or faces of the liner against the base plate to maintain complete weather-proofness, the clip preferably is extended substantially the internal width of the cover, or the inside length of the pin 21, thus bringing into play a maximum extent of the clip spring metal. In practice, it has been found desirable to make the base plate, cover and clip of stainless steel.

I claim:

1. An electrical device cover assembly comprising a base plate applicable to a mounting surface and containing an electrical device access opening, a cavitated cover overlying said opening, a hinge pin extending inside the cover between opposite sides thereof at and in spaced parallel relation with a third side of the cover having transversely shiftable fulcrum edge beyond said opening, and a spring metal hinge clip generally U-shaped in cross section and through which the hinge pin extends, one side of said clip being secured to the base plate and the other side being engaged against the hinge pin so that as the cover is progressively swung open said edge shifts transversely from one to the other sides of an axial plane of the hinge pin normal to the plate whereby the clip initially resists opening the cover and thereafter yieldingly holds the cover in open position.

2. An assembly according to claim 1, in which said other side of the clip is transversely curved at its bearing against the hinge pin.

3. An assembly according to claim 1, in which said fulcrum edge engages against the first mentioned side of the clip.

4. An assembly according to claim 1, in which said clip extends substantially the pin length inside the cover.

5. An assembly according to claim 1, in which said fulcrum edge of the cover engages against the first mentioned side of the clip and the opposite side of the clip is deflected about the hinge pin.

6. An assembly according to claim 1, including also sealing means contained within the cover at the inside of the clip and pin and engaging against he base plate about said opening in the closed position of the cover.

7. An assembly according to claim 6, in which said seal means is an elastomeric liner in the cover and flanged to overlap edges of the cover.

8. An assembly according to claim 7, in which said liner has a thickened portion confined between said clip and the inside surface of the cover.

References Cited by the Examiner
UNITED STATES PATENTS

| | | | |
|---|---|---|---|
| 3,029,972 | 4/62 | Robbins | 230—35 |
| 3,140,344 | 7/64 | Slater et al. | 174—167 |

THERON E. CONDON, *Primary Examiner.*